(12) United States Patent
Cross et al.

(10) Patent No.: US 7,452,937 B2
(45) Date of Patent: Nov. 18, 2008

(54) HIGHLY ELONGATED SINGLE COMPONENT, NON-CORROSIVE RTV SILICONE COMPOSITIONS

(75) Inventors: Robert P. Cross, Rocky Hill, CT (US); Thomas Fay-Oy Lim, Killington, CT (US); Hsien-Kun Chu, Wethersfield, CT (US); Mathias E. Liistro, Jr., Plainville, CT (US); Alfred A. DeCato, Oakville, CT (US); Debora E. Duch, South Glastonbury, CT (US); Bahram Issari, Glastonbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 354 days.

(21) Appl. No.: 11/288,000

(22) Filed: Nov. 28, 2005

(65) Prior Publication Data

US 2007/0123640 A1  May 31, 2007

(51) Int. Cl.
*C08L 83/04* (2006.01)
(52) U.S. Cl. ............... 524/588; 524/492; 524/493; 528/34
(58) Field of Classification Search .............. None
See application file for complete search history.

(56) References Cited

U.S. PATENT DOCUMENTS 6,018,011 A * 1/2000 Scheim et al. ............ 528/34

2005/0234208 A1 * 10/2005 Koch et al. ............ 528/34
2006/0258820 A1 * 11/2006 Schneider ............ 525/477

FOREIGN PATENT DOCUMENTS

| DE | 10219734 | * | 6/2003 |
| WO | WO 2004/067605 | * | 8/2004 |
| WO | WO 2005/108495 A2 | * | 11/2005 |

OTHER PUBLICATIONS

Product data sheet for Aerosil R 974.*
Abstract for JP 63-83166.*

* cited by examiner

*Primary Examiner*—Marc S. Zimmer
(74) *Attorney, Agent, or Firm*—Steven C. Bauman

(57) ABSTRACT

A room temperature vulcanizing silicone polymer composition including:

a) as part of the silicone polymer, a segment including a silicone polymer of Formula (I):

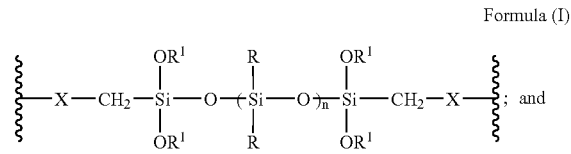

Formula (I)

b) a finely-divided inorganic filler present in an amount of at least about 25% by weight of the total composition.

Enhanced elongation ability is possessed by these compositions.

10 Claims, No Drawings

HIGHLY ELONGATED SINGLE COMPONENT, NON-CORROSIVE RTV SILICONE COMPOSITIONS

FIELD OF THE INVENTION

The present invention relates to room temperature vulcanizing silicone polymer compositions and methods for preparing and using the same. In particular, the silicone polymer compositions are capable of being elongated to many times their original length without breaking.

BRIEF DESCRIPTION OF RELATED TECHNOLOGY

A variety of different adhesive and sealing applications use silicone. In some cases, the silicone is exposed to tensile forces which occur during the use or function of the applications. For example, in applications such as automobile airbags, the sudden expansion and explosive forces which occur during deployment are not tolerated by current silicone compositions. Conventional silicone polymers and compositions typically do not possess sufficient elongation properties for such devices. Numerous other commercial applications would benefit from silicones with enhanced elongations properties. As such, it is desirable to provide silicone polymers which can stretch or elongate to many times their original length without breaking.

SUMMARY OF THE INVENTION

The present invention relates to room temperature vulcanizing (RTV) silicone polymer compositions capable of being highly elongated. For example, the polymers and compositions made therefrom may be capable of expanding from about 500% to about 1000%, and desirably about 600% to about 800% of their original dimension.

In one aspect of the present invention, there is included an RTV silicone polymer composition, which includes:
a) as part of the silicone polymer, a segment including a silicone polymer of Formula (I):

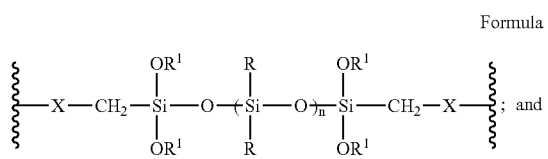

Formula (I)

b) a finely-divided inorganic filler present in an amount of at least about 15% by weight of the total composition, wherein:

In another aspect of the present invention, the present invention provides an RTV silicone polymer composition which includes:
a) a silicone polymer of formula (III):

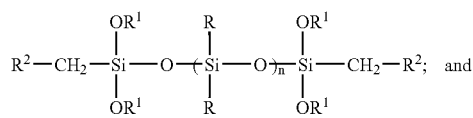

Formula (III)

b) a finely-divided inorganic filler.

In still another aspect, the present invention provides an RTV silicone polymer composition, which includes:
a) a silicone polymer that is the reaction product of:
i. a siloxane having the formula:

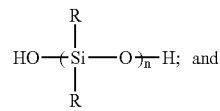

ii. less than one equivalent of a silane having the formula:

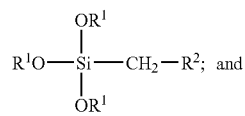

b) a finely-divided inorganic filler.

The present invention also provides a method for making an RTV silicone polymer composition, which includes the steps of:
a) reacting:
i. a siloxane having the formula:

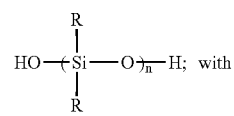

ii. less than one equivalent of a silane having the formula:

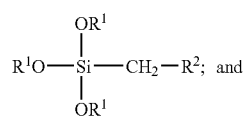

b) mixing the reaction product of step a) with a finely-divided inorganic filler.

In another aspect, the present invention provides an RTV silicone polymer composition which includes:
a) a polymer of Formula (II):

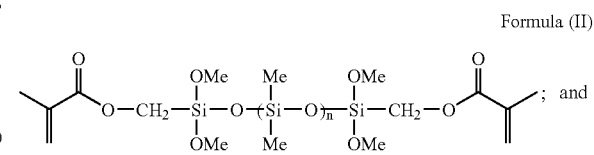

Formula (II)

b) a finely-divided inorganic filler.

The present invention also provides a method for increasing the elongation of an RTV silicone polymer composition, which includes the steps of:

a) reacting:
i. a siloxane having the formula:

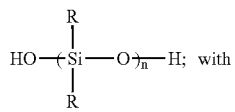 with ii. less than one equivalent of a silane having the formula:

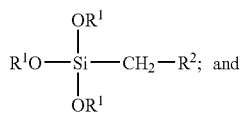

b) mixing the reaction product of step a) with a finely-divided inorganic filler.

In each of the polymer structures above,

R in each occurrence may be the same or different, and may be selected from a $C_1$ to $C_{10}$ hydrocarbon radical;

$R^1$ in each occurrence may be the same or different and is a $C_1$ to $C_{10}$ hydrocarbon radical;

$R^2$ is a member selected from the group consisting of $OR^3$, $NR^3R^4$, $S(O)_mR^5$, $P(O)_rR^5$;

$R^3$ is a member selected from the group consisting of $C_1$ to $C_4$ alkyl, $C_1$ to $C_4$ alkenyl, and $C(O)R^6$;

$R^6$ is a member selected from the group consisting of $C_1$ to $C_4$ alkyl, $C_1$ to $C_4$ alkenyl, and $C_1$ to $C_4$ alkoxy;

X is a member selected from the group consisting of O, $NR^3$, $S(O)_m$, $P(O)_r$;

m is 0, 1, or 2;

n is about 20 to about 2,400; and r is 1 or 2.

DETAILED DESCRIPTION OF THE INVENTION

For purposes of the inventions, the prefix "(meth)" when used with the term acrylate or acryloxy is intended to include methacrylate, acrylate, methacryloxy and acryloxy compounds.

As noted above, the present invention includes an RTV silicone polymer composition containing a silicone segment represented by Formula (I):

Formula (I)

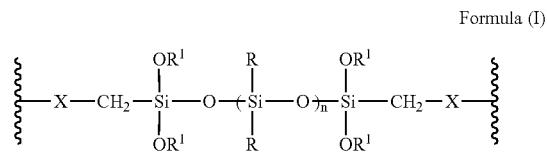

The number of repeating units, "n" plays a role in determining the molecular weight and viscosity of the composition. Thus, n may be an integer from about 1 to about 2,400, and in each occurrence may be the same or different. Advantageously, n may be from about 200 to about 1,500. Generally as the molecular weight increases the viscosity of the composition also increases. At a certain point, the viscosity becomes too great for convenient preparation and use of the composition. As a practical matter, exceeding a viscosity of about 80,000 cP will render the compositions of the invention increasingly difficult to deal with, but viscosities of 100,000 cP and greater have been found to be useful.

R in each occurrence may be the same or different, and may be selected from a $C_1$ to $C_{10}$ hydrocarbon radical. It may be any such radical known to those skilled in the art, and is intended to include groups such as substituted or unsubstituted monovalent alkyl groups such as methyl, ethyl, propyl, and butyl groups; cycloalkyl groups such as a cyclohexyl group; alkenyl groups such as vinyl and allyl groups; and aryl groups, such as phenyl and tolyl groups; as well as those substituted groups obtained by replacing a part or all of the hydrogen atoms in the above-referenced hydrocarbon groups with halogen atoms, cyano groups, and the like. Advantageously, R may be $C_1$ to $C_6$ alkyl. More advantageously, R is methyl.

$R^1$ in each occurrence may be the same or different, and is a $C_1$ to $C_{10}$ hydrocarbon radical. Substituent $R^1$, in combination with the oxygen to which it is attached, forms a hydrolyzable group, which contributes to the inventive compositions' ability to undergo room temperature vulcanization (RTV) cure. RTV cure typically occurs through exposure of the compositions of the invention to moisture, by which the compositions of the present invention may cure to a flexible resin. Thus, a further aspect of the invention relates to the cured polymer formed by reaction of the silicone polymer compositions of the invention upon exposure to moisture. Suitable hydrolyzable groups include alkoxy groups such as methoxy, ethoxy, propoxy, and butoxy; acyloxy groups such acetoxy; aryloxy groups such as phenoxy; and alkoxyalkyl groups such as $CH_3OCH_2CH_2-$. Larger groups such as propoxy and butoxy are slower to react than smaller groups such as methoxy and ethoxy. The rate at which the compositions of the present invention undergo moisture cure can be tailored by choosing appropriate groups for substituent $R^1$. A mixture of different $R^1$ groups can be positioned on a single silicon atom to influence the cure of the composition. Advantageously, $R^1$ may be $C_1$ to $C_4$ alkyl or $-CH_2CH_2OCH_3$ When cured, the RTV silicone polymer compositions of the present invention are capable of being highly elongated. As can be seen in Table 1, the elongation of various compositions of the invention range from about 500% to greater than 1000%.

The room temperature vulcanizing silicone polymer composition may also include a moisture-cure catalyst. Suitable moisture-cure catalysts include metal compounds which contain such metals as titanium, tin, or zirconium. Illustrative examples of the titanium compounds include titanium isopropoxide and tetrabutyl titanate. Illustrative examples of the tin compounds include dibutyltin dilaurate, dibutyltin diacetate, dioctyltindicarboxylate, dimethyltindicarboxylate, and dibutyltin dioctoate. Illustrative examples of the zirconium compounds include zirconium octanoate. The moisture-cure catalysts are employed in an amount sufficient to effectuate moisture-cure, which generally is from about 0.05% to about 5.00% by weight, and advantageously from about 0.5% to about 2.5% by weight.

Accordingly, the present invention also relates to compositions which include the reaction product of the inventive room temperature vulcanizing silicone polymer and water.

The presence of α-heteroatom X is believed to be among the factors which contribute to the silicone polymer's elongation abilities. Suitable heteroatoms include O, N, S, and P. More particularly, these heteroatoms are present as O, $NR^3$, $S(O)_m$, $P(O)_r$, wherein m is 0, 1, or 2;

r is 1 or 2; and $R^3$ may be a member selected from $C_1$ to $C_4$ alkyl, $C_1$ to $C_4$ alkenyl, or $C(O)R^6$, wherein $R^6$ may be a member selected from $C_1$ to $C_4$ alkyl, $C_1$ to $C_4$ alkenyl, or $C_1$ to $C_4$ alkoxy.

Advantageously, X is O.

Another factor believed to contribute to the elongation of the silicone polymer composition of the invention is the choice of filler used. The fillers useful in the present invention are finely-divided inorganic fillers. By "finely-divided" it is meant that the average particle size of the filler is less than about 5 microns. Advantageously, the inorganic filler has an average particle diameter from about 0.2 to about 2.0 microns. In a particularly advantageous embodiment: i) at least about 90% of the inorganic filler has a diameter less than 2 microns; and ii) at least about 65% of the inorganic filler has a diameter less than 1 micron. The filler may be present in an amount of at least about 15% by weight of the total composition. Desirably the filler was be present in an amount from about 25% to about 80%, and more desirably from about about 25% to about 50%, by weight of the total composition.

Illustrative examples of finely divided inorganic fillers suitable for the present invention include finely-divided calcium carbonate, precipitated silica, and fumed silica. A commercially available example of a calcium carbonate filler suitable for use in the present invention is sold by Omya, Inc. under the tradename OMYACARB® UF-FL. A commercially available example of a precipitated silica filler suitable for use in the present is sold by the J.M.Huber corporation under the trade name Zeothix® 95. A commercially available example of a fumed silica suitable for use in the present invention is sold by Degussa under the trade name Aerosil® R 8200. The filler may be added as a dry powder, in resin form, or in a combination thereof.

While the inventive compositions may be used as adhesives, coatings, sealants, and molding compounds, in applications ranging, for example, from preapplied gasketing applications, to virtually any existing RTV silicone application, they are particularly suited for those situations in which in which elongation or stretching is required. These situations would include, for example, use as a sealant for an automotive air bag, or use as a sealant in a scuba diving wet suit.

In an advantageous embodiment, the room temperature vulcanizing silicone polymer composition has a structure represented by Formula (III):

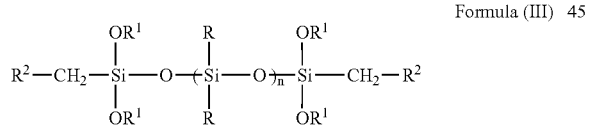

Formula (III)

in which n, R, and $R^1$ are as discussed herein.

The identity of group $R^2$ is also believed to influence the elongation ability of the polymer. $R^2$ in each occurrence may be the same or different and is a $C_1$ to $C_{10}$ hydrocarbon radical containing at least one heteroatom, wherein the heteroatom is a member selected from the group consisting of O, N, S, and P; and the heteroatom is the point of attachment to the methylene group.

The $C_1$ to $C_{10}$ hydrocarbon radical of $R^2$ may be any such radical known to those skilled in the art, and is intended to include groups such as substituted or unsubstituted monovalent alkyl groups such as methyl, ethyl, propyl, and butyl groups; cycloalkyl groups such as a cyclohexyl group; alkenyl groups such as vinyl and allyl groups; and aryl groups, such as phenyl and tolyl groups; as well as those substituted groups obtained by replacing a part or all of the hydrogen atoms in the above-referenced hydrocarbon groups with halogen atoms, cyano groups, and the like. Advantageously, the hydrocarbon radical of $R^2$ is $C_1$ to $C_6$ alkyl and $C_1$ to $C_6$ alkenyl. More advantageously, the hydrocarbon radical of $R^2$ is acryloxy. In a particularly advantageous aspect, they hydrocarbon radical of $R^2$ is (meth)acryloxy In an advantageous aspect, R may be selected from $C_1$ to $C_3$ alkyl, vinyl, or phenyl;

$R^1$ may be $C_1$ to $C_3$ alkyl; and $R^2$ may be selected from $OR^3$, $NR^3R^4$, $S(O)_mR^5$, or $P(O)_rR^5$, wherein m is 0, 1, or 2;

r is 1 or 2;

$R^3$ and $R^4$ are each, independently, selected from f$C_1$ to $C_4$ alkyl, $C_1$ to $C_4$ alkenyl, and $C(O)R^6$, wherein $R^6$ is selected from $C_1$ to $C_4$ alkyl, $C_1$ to $C_4$ alkenyl, or $C_1$ to $C_4$ alkoxy; and $R^5$ is selected from $C_1$ to $C_4$ alkyl, $C_1$ to $C_4$ alkenyl, $C_1$ to $C_4$ alkoxy, or cyano.

In another advantageous aspect, R is methyl; $R^1$ is methyl; and $R^2$ is (meth)acryloxy.

In one aspect, the RTV silicone polymer composition includes a polymer represented by Formula (II):

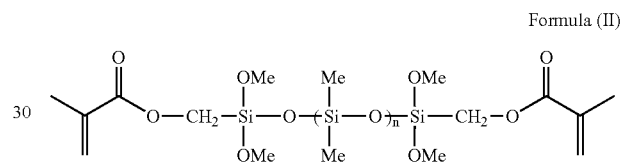

Formula (II)

wherein n is as discussed herein.

In another aspect, the inventive composition includes:

a) a polymer of Formula (II):

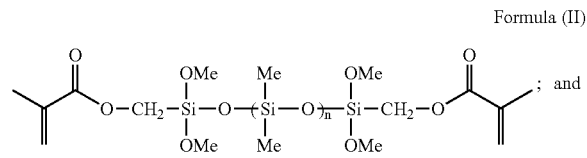

Formula (II)

; and b) an inorganic filler present in an amount of at least about 25% by weight of the total composition, wherein:
  i. at least about 90% of the inorganic filler has a diameter less than 2 microns; and
  ii. at least about 65% of the inorganic filler has a diameter less than 1 micron, wherein n and the inorganic filler are as discussed herein.

As noted above, the present invention also provides a method for making the RTV silicone polymer compositions of the invention, which includes the steps of:

a) reacting:
  i. at least one siloxane having the formula:

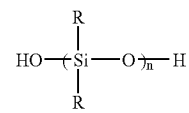

wherein
n is about 20 to about 2,400; and
R in each occurrence may be the same or different and may be a $C_1$ to $C_{10}$ hydrocarbon radical; with
ii. less than one equivalent of a silane having the formula:

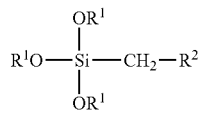

wherein
$R^1$ in each occurrence may be the same or different and may be a $C_1$ to $C_{10}$ hydrocarbon radical; and
$R^2$ in each occurrence may be the same or different and may be a $C_1$ to $C_{10}$ hydrocarbon radical containing at least one heteroatom, wherein
the heteroatom is a member selected from O, N, S, or P; and
the heteroatom is the point of attachment to the methylene group; and
b) mixing the reaction product of step a) with an inorganic filler as described herein.

R, $R^1$, $R^2$, and n are as described herein. By these same steps, there is also provided a method for increasing the elongation of an RTV silicone composition. The siloxane of i) is mixed with the silane of ii). Advantageously, the siloxanes of i) should have a viscosity of at least about 1,000 cP at 25° C. The present invention contemplates that different siloxanes may be combined for use in the above-described method. In some embodiments a viscosity of about 100,000 cP is desirably an upper limit for convenient use and preparation of the compositions of the invention. Siloxanes of different viscosities may be combined, to achieve the desired properties, bearing in mind the practicalities of useful viscosities. For example a siloxane of 60,000 cP may be combined with a siloxane of 100,000 cP, producing a silicone polymer composition having 80,000 cP.

The siloxane of i) may be mixed with the silane of ii) in the presence of an appropriate catalyst. The appropriate catalyst may be any such appropriate catalyst known to those skilled in the art, such as lithium diisopropylamine. Advantageously, the catalyst is an alkyl base such as butyl lithium (BuLi). Other reagent catalysts may be employed, such as those described in U.S. Pat. No. 5,663,269, which is hereby incorporated by reference. While the appropriate catalyst may be present in an effective amount, desirable ranges include about 0.005% to about 1.5% by weight.

The RTV silicone polymer compositions of the invention may also include an end-capping catalyst. The end-capping catalyst may be any such catalyst known to those skilled in the art which would promote coupling of the siloxane of i) with the silane of ii). The end-capping catalyst may be any catalyst known to those skilled in the art which would promote coupling of the hydroxy-terminated siloxane of i) with the end-capping silane of ii). Advantageously, the end-capping catalyst is an amine compound. Illustrative examples of such an amine compound include pyridine, picoline,utidine, pyrazine, piperidone, piperidine, piperazine, pyrazole, pyridazine, pyrimidine, pyrrolidine, butylamine, octylamine, laurylamine, dibutylamine, monoethanolamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5,4,0]undecene (DBU), and salts of these amine compounds.

The end-capping catalyst is present in an amount sufficient to effectuate coupling of the hydroxy-terminated polydiorganosiloxane with the end-capping silane, and is generally present in amounts of about 0.0001% to about 5% by weight of the total composition.

The inventive compositions may also contain one or more amino-containing silane compounds which act as adhesion promoters. These amino-containing silane compounds may be present in amounts of about 0.1% to about 5.0% by weight of the composition. Desirably, these compounds are present in amounts of about 0.74% to about 1.4% by weight of the composition. Amino-containing silane compounds which are useful in the present invention include, but are not limited to, silane compounds containing amino-alkyl groups, such as gamma-ureidopropyltrimethoxy silane, 3-aminopropyl trimethoxysilane, N,N'-bis (3-trimethoxy silylpropyl) urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, tertiary alkyl carbamate silane, and aminoethyl-3-aminopropyl-methyl-dimethylsilane. Other desirable amino-containing silane compounds include silane compounds containing amino-cycloaliphatic groups such as methyl tris (cyclohexylamino)silane and silane compounds containing amino-aromatic groups such as methyl tris-(N-methylbenzamido)silane. Adhesion promoters may be present in amounts of up to about 5%, and desirably up to about 2% by weight.

The inventive compositions may also contain other additives so long as they do not inhibit the curing mechanism, elongation, or intended use. For example, conventional additives such as promoters, pigments, moisture scavengers, inhibitors, odor masks, and the like may be included.

In another aspect the invention provides a method for using the RTV silicone polymer composition of the invention to join or seal two substrates, which includes the steps of:
a) applying the uncured composition to at least one of the two substrate surfaces;
b) mating the two substrate surfaces in an abutting relationship to form an assembly;
c) exposing the composition to moisture; and
d) maintaining the abutting relationship for a time sufficient to allow the composition to cure.

EXAMPLES

An illustrative procedure for the preparation of compositions of the invention is as follows:

Silanol-terminated polydimethylsiloxane is reacted under vacuum with about methacryloxymethyltrimethoxysilane in the presence of butyllithium at room temperature, with the resulting methanol byproduct removed by vacuum. About 30% to about 40% dry ground calcium carbonate is compounded into the mixture. About 0.05% to about 0.1% tin catalyst is mixed into formulation.

TABLE 1

Table 1 shows the components of eight typical compositions of the invention.

| Component (%) | Composition 1 | 2 | 3 | 4 | 5 | 6 | 7 | 8 |
|---|---|---|---|---|---|---|---|---|
| Siloxane A | 87.43 | 57.99 | 88.85 | 60.87 | 59.82 | 52.55 | 51.01 | |
| Siloxane B | | | | | | | | 65.10 |
| Plasticizer | | | | | | 9.03 | 8.99 | |
| Filler A | | 40.85 | | 37.33 | 38.44 | 35.21 | 37.69 | 30.05 |
| Filler B | | | 10.00 | | | | | |
| Filler C | 10.93 | | | | | | | 3.00 |
| End-Capping Silane A | 1.08 | 0.75 | 0.75 | 1.07 | 0.86 | | 1.33 | 0.90 |
| End-Capping Silane B | | | | | | | 0.33 | |
| End-Capping Silane C | | | | | | 1.35 | | |
| End-Capping Catalyst | | 0.01 | 0.01 | 0.01 | 0.01 | 0.01 | 0.01 | |
| Other Silane A | 0.39 | 0.25 | 0.25 | | 0.72 | | | |
| Other Silane B | | | | 0.50 | | | | 0.20 |
| Other Silane C | | | | | | 1.13 | | |
| Other Silane D | | | | | | 0.45 | 0.40 | 0.50 |
| Curing Catalyst A | 0.17 | 0.10 | 0.09 | 0.14 | 0.10 | 0.22 | 0.19 | 0.20 |
| Curing Catalyst B | | 0.05 | 0.05 | 0.08 | 0.05 | 0.05 | 0.05 | 0.05 |
| Curing Catalyst C | 0.08 | | | | | | | |
| Total (%) | 100.08 | 100.00 | 100.00 | 100.00 | 100.00 | 100.00 | 100.00 | 100.00 |
| Tensile Strength (psi) | 247 | >200 | 371 | 271 | 303 | 496 | 207 | 135 |
| Elongation (%) | 502 | >1000 | 574 | 997 | 587 | 721 | 543 | 997 |

Siloxanes
  Siloxane A is an 80,000 cP silanol terminated PDMS
  Siloxane B is a 20,000 cP silanol terminated PDMS Plasticizer
  The plasticizer is a 30,000 cP polybutene.

Fillers
  Filler A is Omyacarb UF ultrafine ground calcium carbonate.
  Filler B is Zeothix 95 precipitated silica.
  Filler C is Degussa R 8200 surface treated fumed silica.

End-Capping Silanes
  End-Capping Silane A is methacryloxymethyltrimethoxysilane, sold under the trade name Geniosil® XL 33, by Wacker-Chemie GmbH.
  End-Capping Silane B is (methacryloxymethyl)methyldimethoxysilane, sold under the trade name Geniosil® XL 32 by Wacker-Chemie GmbH.
  End-Capping Silane C is vinyltrimethoxysilane.

End-Capping Catalyst
  The End-Capping Catalyst is diazabicycloundecene (DBU).

Other Silanes
  Other Silane A is aminopropyltrimethoxysilane.
  Other Silane B is aminopropyltrimethoxysilane, sold under the trade name S340® by Chisso Corporation.
  Other Silane C is vinyltrienoxysilane.
  Other Silane D is tris-trimethoxysilylisocyanurate, sold under the trade name Silquest® Y-11957.

Curing Catalysts
  Curing Catalyst A is DBU
  Curing Catalyst B is dioctyltindicarboxylate.
  Curing Catalyst C is dimethyltindicarboxylate.

What is claimed is:

1. A room temperature vulcanizing silicone polymer composition, which includes:
  a) as part of the silicone polymer, a segment comprising a silicone polymer of Formula (I):

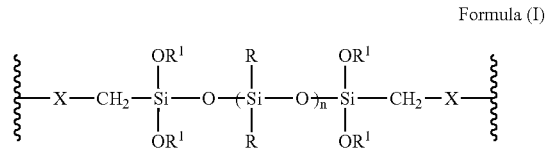

Formula (I)

wherein
    n is about 20 to about 2,400;
    R in each occurrence may be the same or different and is a $C_1$ to $C_{10}$ hydrocarbon radical;
    $R^1$ in each occurrence may be the same or different and is a $C_1$ to $C_{10}$ hydrocarbon radical; and
    X is a member selected from the group consisting of O, $NR^3$, $S(O)_m$, and $P(O)_r$, wherein
      m is 0, 1, or 2,
      r is 1 or 2;
      $R^3$ is a member selected from the group consisting of $C_1$ to $C_4$ alkyl, $C_1$ to $C_4$ alkenyl, and $C(O)R^6$,
        wherein $R^6$ is a member selected from the group consisting of $C_1$ to $C_4$ alkyl, $C_1$ to $C_4$ alkenyl, and $C_1$ to $C_4$ alkoxy; and
  b) an inorganic filler present in an amount of at least about 15% by weight of the total composition, wherein:
    i. at least about 90% of the inorganic filler has a diameter less than 2 microns;
    ii. at least about 65% of the inorganic filler has diameter less than 1 micron; and
    iii. the inorganic filler has an average particle diameter from about 0.2 to about 2.0 microns.

2. The composition of claim 1, further comprising a moisture-cure catalyst.

3. The composition of claim 1, wherein the polymer is a polymer of Formula (II):

Formula (II)

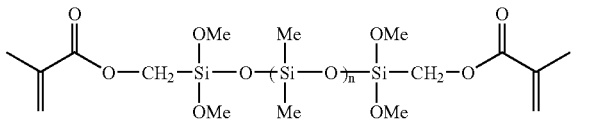

wherein n is about 20 to about 2,400.

4. A method for using the composition of claim 1 to join or seal two substrates comprising the steps of:
 a) applying the composition to at least one of the two substrate surfaces;
 b) mating the two substrate surfaces in an abutting relationship to form an assembly;
 c) exposing the composition to moisture; and
 d) maintaining the abutting relationship for a time sufficient to allow the composition to cure.

5. The composition of claim 1, wherein the composition, when cured, is capable of elongation of greater than 1000%.

6. The composition of claim 1, wherein the silicone polymer is of formula (III):

Formula (III)

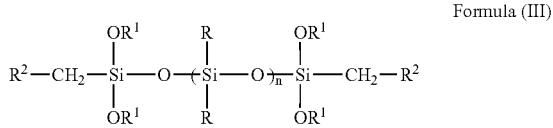

wherein n is about 20 to about 2,400;
 R in each occurrence may be the same or different and is a $C_1$ to $C_{10}$ hydrocarbon radical;
 $R^1$ in each occurrence may be the same or different and is a $C_1$ to $C_{10}$ hydrocarbon radical; and
 $R^2$ in each occurrence may be the same or different and is a $C_1$ to $C_{10}$ hydrocarbon radical containing at least one heteroatom, wherein
  the heteroatom is a member selected from the group consisting of O, N, S, and P; and
  the heteroatom is the point of attachment to the methylene group.

7. The composition of claim 6, wherein R is a member selected from the group consisting of $C_1$ to $C_3$ alkyl, vinyl, and phenyl; $R^1$ is $C_1$ to $C_3$ alkyl; and $R^2$ is a member selected from the group consisting of $OR^3$, $NR^3R^4$, $S(O)_mR^5$, and $P(O)_rR^5$, wherein
 m is 0, 1, or 2;
 r is 1 or 2;
 $R^3$ and $R^4$ are each, independently, members selected from the group consisting of $C_1$ to $C_4$ alkyl, $C_1$ to $C_4$ alkenyl, and $C(O)R^6$,
  wherein $R^6$ is a member selected from the group consisting of $C_1$ to $C_4$ alkyl, $C_1$ to $C_4$ alkenyl, and $C_1$ to $C_4$ alkoxy; and
 $R^5$ is a member selected from the group consisting of $C_1$ to $C_4$ alkyl, $C_1$ to $C_4$ alkenyl, $C_1$ to $C_4$ alkoxy, and cyano.

8. A room temperature vulcanizing silicone polymer composition, comprising:

a) a silicone polymer that is the reaction product of:
 i. a siloxane having the formula:

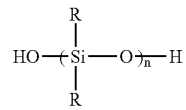

wherein
 n is about 20 to about 2,400; and
 R in each occurrence may be the same or different and is a $C_1$ to $C_{10}$ hydrocarbon radical; and
 ii. less than one equivalent of a silane having the formula:

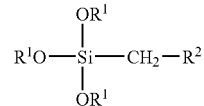

wherein
 $R^1$ in each occurrence may be the same or different and is a $C_1$ to $C_{10}$ hydrocarbon radical; and
 $R^2$ in each occurrence may be the same or different and is a $C_1$ to $C_{10}$ hydrocarbon radical containing at least one heteroatom, wherein
  the heteroatom is a member selected from the group consisting of O, N, S, and P; and
  the heteroatom is the point of attachment to the methylene group; and
b) an inorganic filler present in an amount of at least about 15% by weight of the total composition, wherein:
 i. at least about 90% of the inorganic filler has a diameter less than 2 microns; and
 ii. at least about 65% of the inorganic filler has a diameter less than 1 micron.

9. A method for making a room temperature vulcanizing silicone polymer composition comprising the steps of:
a) reacting:
 i. a siloxane having the formula:

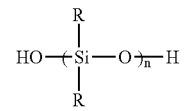

wherein
 n is about 20 to about 2,400; and
 R in each occurrence may be the same or different and is a $C_1$ to $C_{10}$ hydrocarbon radical; with
 ii. less than one equivalent of a silane having the formula:

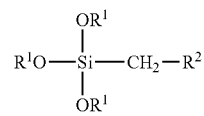

wherein
 $R^1$ in each occurrence may be the same or different and is a $C_1$ to $C_{10}$ hydrocarbon radical; and $R^2$ in each occurrence may be the same or different and is a $C_1$ to $C_{10}$ hydrocarbon radical containing at least one heteroatom, wherein the heteroatom is a member selected from the group consisting of O, N, S, and P; and the heteroatom is the point of attachment to the methylene group; and b) mixing the reaction product of step a) with an inorganic filler present in an amount of at least about 25% by weight of the total composition, wherein:

i. at least about 90% of the inorganic filler has a diameter less than 2 microns; and ii. at least about 65% of the inorganic filler has a diameter less than 1 micron.

10. A method for increasing the elongation of a room temperature vulcanizing silicone polymer composition, comprising the steps of:

a) reacting:

i. a siloxane having the formula:

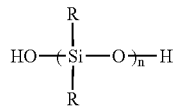

wherein n is about 20 to about 2,400; and

R in each occurrence may be the same or different and is a $C_1$ to $C_{10}$ hydrocarbon radical; with ii. less than one equivalent of a silane having the formula:

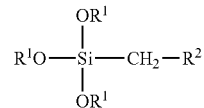

wherein $R^1$ in each occurrence may be the same or different and is a $C_1$ to $C_{10}$ hydrocarbon radical; and $R^2$ in each occurrence may the same or different and is a $C_1$ to $C_{10}$ hydrocarbon radical containing at least one heteroatom, wherein the heteroatom is a member selected from the group consisting of O, N, S, and P; and the heteroatom is the point of attachment to the methylene group; and b) mixing the reaction product of step a) an inorganic filler present in an amount of at least about 25% by weight of the total composition, wherein:

i. at least 90% of the inorganic filler has a diameter less than 2 microns; and ii. at least about 65% of the inorganic filler has a diameter less than 1 micron.

\* \* \* \* \*